United States Patent [19]

Kawatsu

[11] 4,073,580

[45] Feb. 14, 1978

[54] FADE PHOTOGRAPHING CONTROL APPARATUS FOR CINE CAMERA

[75] Inventor: Toshitatsu Kawatsu, Shimosuwa, Japan

[73] Assignee: Sankyo Kogaku Kogyo Kabushiki Kaisha, Japan

[21] Appl. No.: 698,913

[22] Filed: June 23, 1976

[51] Int. Cl.² .......................................... G03B 21/36
[52] U.S. Cl. .................................................. 352/91 C
[58] Field of Search ................. 352/91 R, 91 C, 91 S, 352/217

[56] References Cited

U.S. PATENT DOCUMENTS

| | | | |
|---|---|---|---|
| 3,246,944 | 4/1966 | Winkler | 352/91 S |
| 3,637,301 | 1/1972 | Nakayama | 352/91 S |
| 3,712,720 | 1/1973 | Winkler | 352/91 S |

*Primary Examiner*—Monroe H. Hayes
*Attorney, Agent, or Firm*—Cooper, Dunham, Clark, Griffin & Moran

[57] ABSTRACT

A fade photographing controlling apparatus for a cine or movie camera comprises a rotary member adapted for alternate rotation through 180° in a first direction and in an opposite, second direction, and a cam member including first and second eccentric cam surfaces and adapted to be coupled with the rotary member for rotation therewith only when the rotary member rotates in the first direction. The initial rotation of the rotary member in the first direction is utilized for fade out photographing, and the succeeding rotation of the rotary member in the second direction is used to reversely feed the film portion which has been used during the fade out photographing, while a final rotation of the rotary member in the first direction is utilized for fade in photography on the same film portion. The cam member controls the opening and closing of a shutter during the fade out/fade in photographing, and means are also provided to control forward and reverse feed of the film whenever fade photographing is performed. Clutch means is provided to transmit or interrupt the rotation from a motor to the rotary member, and is controlled by an operating member which may be operated externally of the apparatus.

11 Claims, 20 Drawing Figures

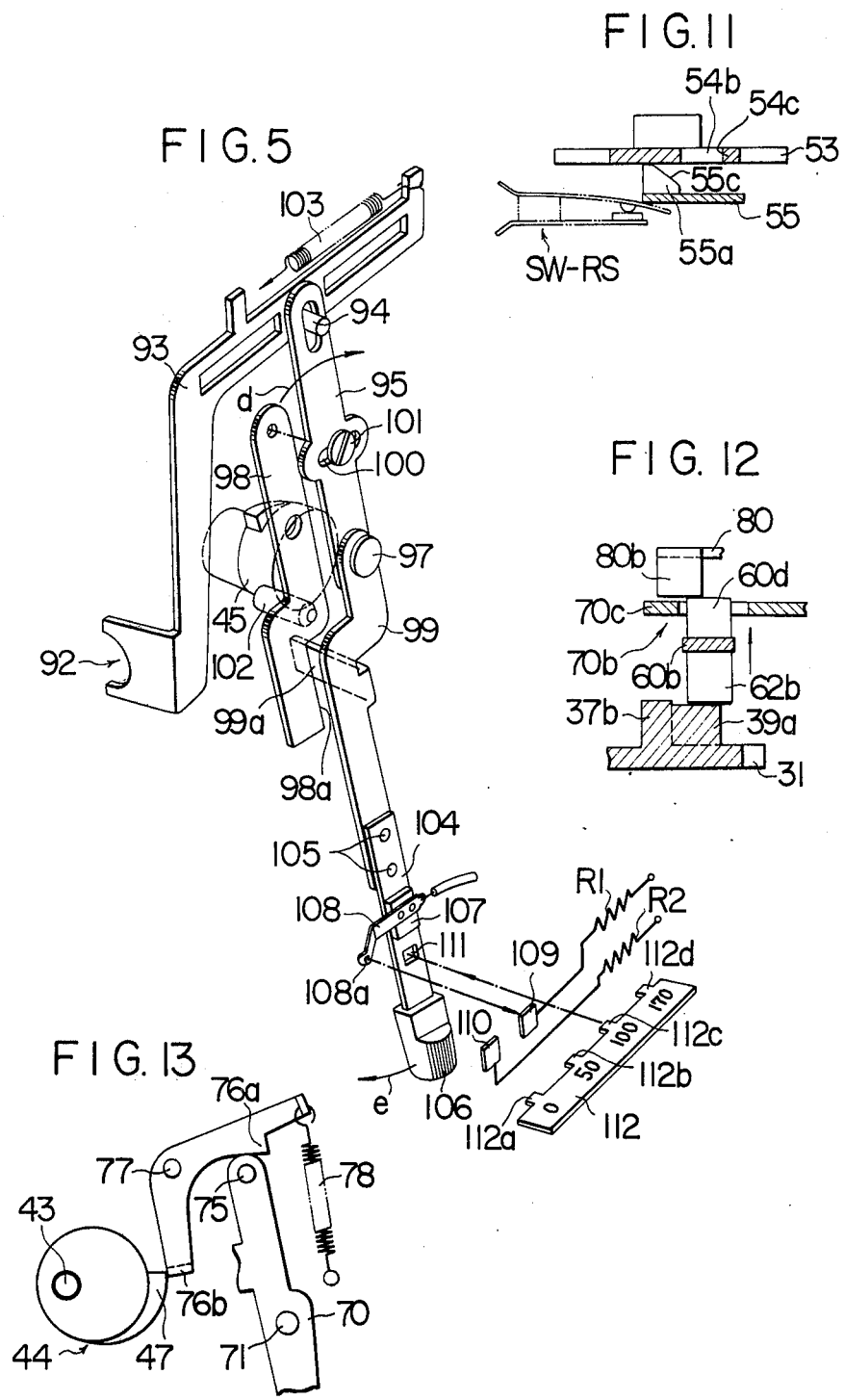

FADE PHOTOGRAPHING CONTROL APPARATUS FOR CINE CAMERA

BACKGROUND OF THE INVENTION

The invention relates to a fade photographing apparatus for cine camera, and more particularly to a fade out/fade in photographing apparatus for cine camera having a shutter opening adjusting device capable of controlling the exposure by varying the shutter opening formed by a pair of sector-shaped shutter blades which are disposed in overlapping relationship.

A fade out photographing takes place toward the end of a film roll which may have a length corresponding to 50 to 100 frames, for example, by gradually decreasing exposure until zero exposure is reached, whereupon the fade out photographing is terminated. A fade in photographing takes place by initially feeding a film portion which has been utilized during the fade out photographing in a reverse direction, and taking pictures on such film portion while gradually increasing the exposure until the latter reaches a given value, whereupon the fade in photographing is terminated.

The gradual decrease in the exposure during the fade out photographing is achieved by varying the shutter opening formed by a pair of overlapping sector-shaped shutter blades in a closing direction. Similarly, the gradual increase in the exposure during the fade in photographing is achieved by varying the shutter opening from zero in an opening direction. Since the pictures are twice taken over a given length of film in the fade photographing it requires the proper control over the film length being fed in the reverse direction subsequent to a fade out photographing as well as a proper control of the exposure over the given film length. In the most advanced fade photographing apparatus available, a fade photographing controlling apparatus is provided which is internally housed within a cine camera and actuated to perform a proper exposure control and a proper control over the reverse feeding of the film in response to a given procedure, without having recourse to the skill of an operator.

However, such conventional fade photographing apparatus have inconveniences such that the fade photographing controlling apparatus internally housed in the cine camera is very complex and the procedure for the fade photographing is relatively troublesome.

SUMMARY OF THE INVENTION

It is an object of the present invention to provide an improved fade photographing apparatus which eliminates the inconveniences of conventional fade photographing apparatus.

According to the invention, there is provided a rotary member which can rotate in a first direction and in an opposite, second direction. The rotary member is connected through a clutch with a film drive motor and operates a shutter assembly, in response to the manual operation of a single operating member, thereby initiating a fade photographing process. Then a fade photographing control apparatus is effective to operate the rotary member and associated members to provide an automatic control of a proper exposure and a reverse feeding of a film over a given length to complete a fade in/fade out operation.

BRIEF DESCRIPTION OF THE DRAWINGS

FIG. 5 is a perspective view of a shutter opening adjusting mechanism;

FIG. 11 is an elevational section taken along the line XI—XI shown in FIG. 7A;

FIG. 12 is an elevational section taken along the line XII—XII shown in FIG. 6D; and FIG. 13 is a fragmentary side elevation of the cam member, detent member and the operating member, illustrating that the detent member of the operating member is actuated by the cam member to release the operating member.

DETAILED DESCRIPTION OF THE PREFERRED EMBODIMENTS

Figure 1:
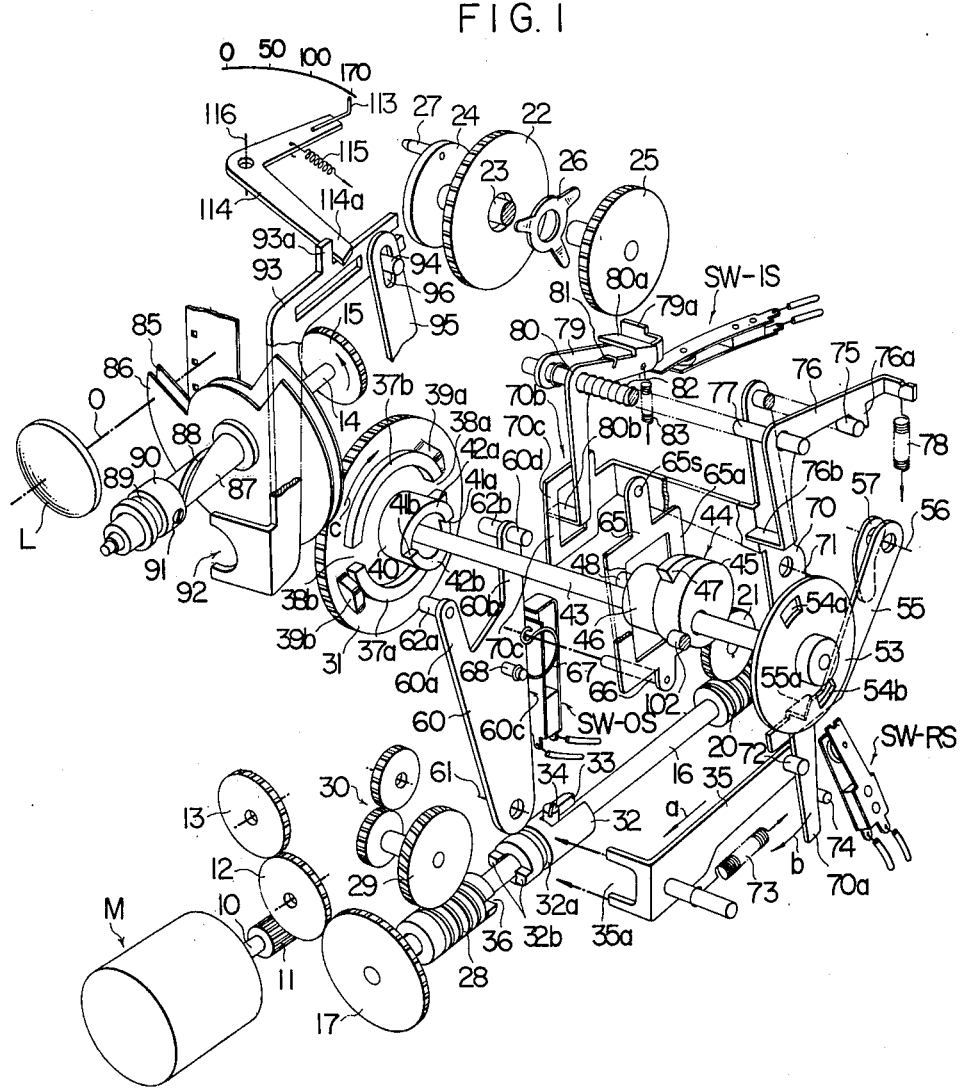
FIG. 1 is an exploded, perspective view of a fade photographing controlling apparatus constructed in accordance with one embodiment of the invention, it being understood that certain shafts and pivots are either omitted or depicted as extending beyond their actual length and the relative position of various members is dislocated for the convenience of illustration.
Figure 2:
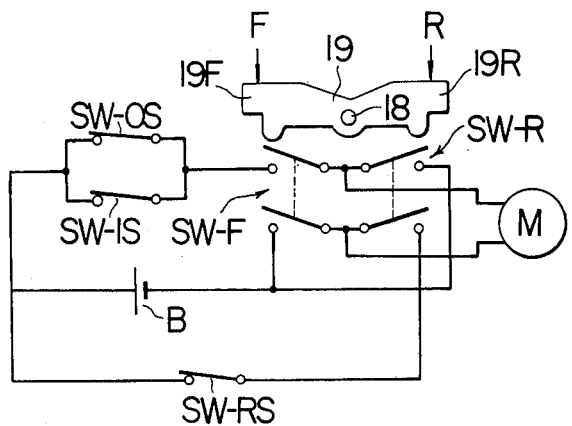
FIG. 2 is a circuit diagram of an exemplary drive motor control circuit associated with the film and the fade photographing apparatus.

Referring to FIG. 1, there is shown a motor M which is used for driving a film and a shutter of a cine camera. The motor M is disposed in the lower portion of the camera body at the front end thereof, and has a shaft 10 on which is mounted a pinion 11 which meshes with an intermediate gear 12 and another intermediate gear 13 for driving a shutter drive gear 15 (above) which is fixedly mounted on a shutter shaft 14. The pinion 11 also drives, through the intermediate gear 12, a gear 17 which is fixedly mounted on one end of a film drive shaft 16. A pivot 18 is mounted at a suitable position on the exterior of the cine camera for rockably supporting a shutter button 19 (see FIG. 2), and when one end 19F of the button 19 is depressed with a finger, a forward rotation switch SW-F is closed to cause a rotation of the motor M and shaft 16 in a direction to feed the film in the forward direction. Conversely, when the other end 19R of the shutter button 19 is depressed to close a reverse rotation switch SW-R, the motor rotates in the opposite direction to feed the film in the reverse direction. In FIG. 2, a character B represents a source battery for the motor M. The circuit shown in FIG. 2 will be described more fully later.

A worm 20 is secured to the other end of the film drive shaft 16, and meshes with a worm wheel 21, that imparts rotation to a film drive gear 22, which is shown in the top portion of FIG. 1. The film drive gear 22 loosely fits on a film winding stub shaft 23 which is disposed along a direction perpendicular to the optical axis O of a taking lens L toward the end of the axis adjacent to a film cassette loading chamber (not shown). The shaft 23 has a disc 24 fixedly mounted thereon which is exposed within the film cassette loading chamber. A disc 25 having a knurled periphery is fixedly mounted on the opposite end of the shaft 23. A leaf spring 26 loosely fits on the shaft 23 intermediate the film drive gear 22 and the disc 25 and resiliently engages the gear 22 and the shaft 23, thereby providing a frictional coupling therebetween. The disc 24 fixedly carries a pin 27 which is exposed in the film cassette loading chamber and serves to drive a film take-up shaft within a film cassette such as of a Super 8 type, for example, manufactured by Kodak, by engagement therewith.

Loosely fitting on the front end of the film drive shaft 16 is a worm 28 which drives a fade out/fade in control mechanism. The worm 28 meshes with a worm wheel 29 which is in turn connected through an intermediate gear assembly 30 with a fade out/fade in gear 31 (above).

A clutch 32 comprises a sleeve which is formed with an axially extending slit 33, into which is fitted a pin 34 fixedly mounted on the film shaft 16, thus making it axially displaceable and rotationally integral with the shaft. The clutch 32 is also formed with a circumferential groove 32a which is loosely engaged by a fork 35a of a shifter 35, the arrangement being such that as the shifter 35 is moved forwardly or in the direction indicated by an arrow a, by a fade out/fade in operating member to be described later, the fork 35a displaces the clutch 32 forwardly in the axial direction thereof so that a pair of projections 32b formed on the front end face of the clutch are engageable with notches 36 formed in the rear end face of the worm 28.

On its one side, the gear 31 is formed with a pair of arcuate ribs 37a, 37b having their end faces disposed in directly opposing relationship, these end faces defining a pair of passages 38a, 38b for pins to be described later. A pair of chevron-shaped cams 39a, 39b are formed on the gear adjacent to the passages 38a, 38b at positions circumscribing one end each of the ribs 37a, 37b. Additionally, the gear 31 has a cam sleeve 40 fixedly mounted thereon, the cam sleeve 40 having an end face which is formed with a pair of steps 41a, 41b which are displaced by 180° from each other. A pair of gently bevelled surfaces 42a, 42b extend from the top of one of the steps to the bottom of the other step.

Figure 3:
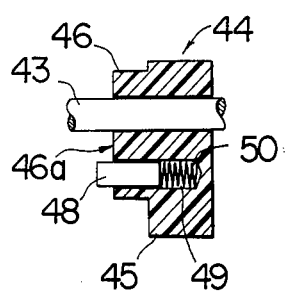
FIG. 3 is an elevational section of a cam member including eccentric cams which are associated with the controlling apparatus.

The gear 31 is fixedly mounted on one end of a shaft 43, on which is loosely fitted a stepped cam 44, which comprises a pair of integrally formed eccentric cams 45, 46 of different sizes. The larger eccentric cam 45 is formed with a third cam 47 which extends from part of the peripheral surface thereof. The smaller eccentric cam 46 has an end face in which a bore 49 is formed for receiving a pin 48 so as to be movable in the axial direction as illustrated in FIG. 3, the pin 48 being engageable with the steps 41a, 41b formed in the cam sleeve 40. A compression spring 50 is disposed between the inner end of the pin 48 and the bottom of the bore 49 to urge the pin 48 in a direction to project from the end face 46a of the eccentric cam 46. However, the extension of the pin 48 out of the end face 46a is prevented by abutment of the outer end of the pin 48 against the bevelled surface 42a or 42b of the cam sleeve 40.

Figure 4:
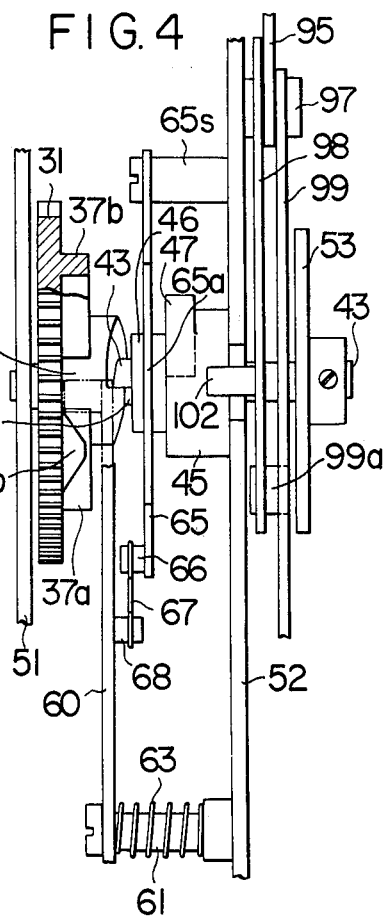
FIG. 4 is a side elevation of the fade photographing controlling apparatus, only essential parts being shown for the brevity of illustration.

As shown in FIG. 4, a fade out/fade in mechanism includes the shaft 43, which is rotatably mounted on a pair of sideplates 51, 52, with the gear 31 and the cam sleeve 40 being disposed between these sideplates 51, 52. The shaft 43 has an extension which projects outwardly of the sideplate 52 and on which is fixedly mounted a disc 53, operating to open or close a film reverse feed stop switch SW-RS. The disc 53 is formed with a pair of 180° displaced or diametrically opposite openings 54a, 54b. Located between the disc 53 and the sideplate 52 is a portion of a switch operating lever 55 which is pivotally mounted at 56 on the sideplate 52. The lever 55 includes an engaging and disengaging portion 55a which is formed by folding it from the remainder of the lever 55 and which is maintained in abutment against the inner surface of the disc 53 under the resilience of a leaf spring 57 which is disposed adjacent to the opposite end of the lever 55. As shown in FIG. 7A, the extent of the rocking motion of the lever 55 is limited by a pair of stops 58, 59 fixedly mounted on the sideplate 52 and located on a path of movement of a free end 55b thereof.

A two arm member 60 (center FIG. 1) that loosely fits on a pivot 61 which is fixedly mounted on the sideplate 52 (see FIG. 4) includes a pair of arms 60a, 60b which extend straddling the shaft 43. A spring 63 is disposed on the pin 61 and urges the member 60 in a manner such that a pair of pins 62a, 62b fixedly mounted on the free end of each arm 60a, 60b bear against the gear 31. The pins 62a, 62b are spaced from each other by a distance which is substantially equal to the diameter of a circle defined by the pair of arcuate ribs 37a, 37b. A normally closed switch SW-OS is fixedly mounted on the sideplate 52 adjacent to one edge 60c of the two arm member 60, and is adapted to be operated by such edge 60c as the member 60 rocks. Specifically, as it is pushed by the edge 60c, the switch opens to deenergize the motor M.

Figure 6A:
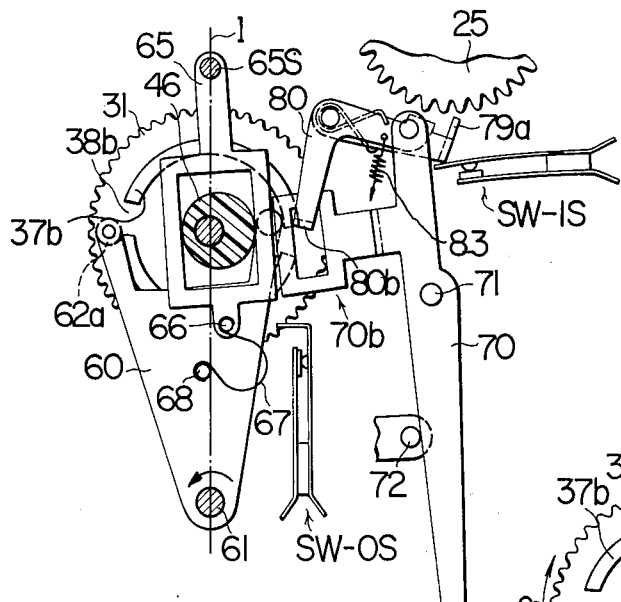
FIGS. 6A to 6D are side elevations illustrating various phases of operation of the fade photographing controlling apparatus.

A rocking member 65 comprising a rectangular frame 65a which surrounds the eccentric cam 46 is pivotally mounted on pivot 65S on the sideplate 52, and fixedly carries a pin 66 on its lower end, around which is wrapped one end of a curved spring 67 which has a resilience to bias its opposite ends to move apart from each other. The other end of the curved spring 67 engages a pin 68 which is fixedly mounted on the two arm member 60. The pivot 65S of the rocking member 65, the shaft 43 and the pivot 61 of the two arm member 60 are substantially vertically aligned, and the pins 66, 68 are maintained on the opposite sides of a line l (see FIG. 6A) which joins the pivots 65 and 61. By way of example, when the pin 66 is located on the right-hand side of the line l as shown in FIG. 6A, the other pin 68 is located on the left-hand side of the line l. If the pin 66 is displaced to the left-hand side of the line l as shown in FIG. 6C, the other pin 68 moves to the right-hand side of the line l. The pin 66 traverses the line l by a rocking motion which is produced by a rotation of the eccentric cam 46 which causes the rocking member 65 to rock. The arrangement is such that the spring 67 urges the two arm member 60 to move to the right or left as the rocking member 65 is displaced to assume a right- or a left-hand position. When the pin 66 is located on the right-hand side of the line *l* as shown in FIG. 6A, the two arm member 60 is urged to rotate counterclockwise about the pivot 61, while when the pin 66 is located on the left-hand side of the line *l* as shown in FIG. 6C, the two arm member 60 is urged to rotate clockwise.

An operating member 70 for the fade out/fade in photographing is rockably mounted at 71 on the sideplate 52, and includes a lower end 70a which extends to the exterior of the cine camera for allowing external operation thereof. A pin 72 fixedly mounted on the rear end of the shifter 35 bears against the front edge of the lower end 70a under the resilience of a spring 73 which biases the shifter 35 in the rearward direction. A rocking motion of the operating member 70 about the pivot 71 is limited by a stop 74.

Figure 8:
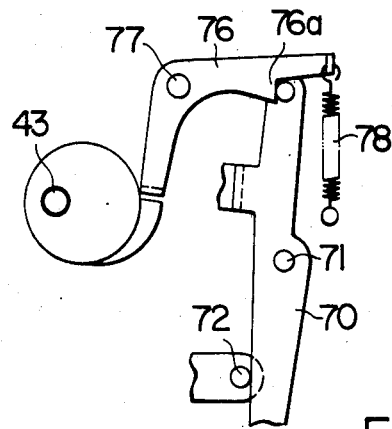
FIG. 8 is a side view of a detent mechanism for the operating member.

At its top end, the operating member 70 fixedly carries a pin 75, which is effective, when the operating member 70 rocks in the direction of an arrow *b* about the pin 71 against the resilience of the spring 73, to engage a detent projection 76a of a detent member 76 to lock the operating member 70 in its rocked position, as illustrated in FIG. 8.

The detent member 76 is rockably mounted on a shaft 77 which is fixedly mounted on the sideplate 52, and includes a downwardly extending arm provided with a folded piece 76b which is located on the path of rotation of the third cam 47. A spring 78 urges the detent member 76 to rotate clockwise about the shaft 77, but the resulting rotating is prevented by the pin 75.

A detent arm 79 and a release member 80 are rotatably mounted on the shaft 77 in overlapping relationship with each other. At its free end, the detent arm 79 is formed with an engaging portion 79a which engages or disengages from the knurled peripheral edge of the disc 25 to prevent or permit its rotation. Spring 81 is disposed between the detent arm 89 and the release member 80, the opposite ends of the spring being secured to these members. The spring 81 urges the detent arm 79 to rotate counterclockwise relative to the release member 80, but such rotation of the detent arm 79 is prevented by a folded piece 80a formed on the release member 80.

The release member 80 is urged toward the detent arm 79 by a compression spring 82 which is loosely disposed on the shaft 77, and is also urged to rotate clockwise about the shaft 77 by a spring 83. However, the resulting rotation of the release member 80 is prevented by abutment of an engaging and disengaging portion 80b of the release member 80 against one side 70c of the rectangular frame 70b, the portion 80b comprising a folded piece formed at one end of a downwardly extending arm of the release member 80.

Rectangular frame 70b is integrally formed with the operating member 70, and moves the portion 80b to rock the release member 80 against the resilience of the spring 83 as the operating member 70 is rocked in the direction of the arrow *b*, thereby allowing the engaging portion 79a of the detent arm 79 which rocks in following relationship with the release member 80 to engage the disc 25. As the two arm member 60 assumes the right-hand position shown in FIG. 6C, the free end of the engaging and disengaging portion 80b of the release member 80 is located opposite to the end face of a pin 60d which is fixedly mounted on one arm 60b of the two arm member 60.

A normally closed switch SW-IS which is operated by the free end of the detent arm 79 is adapted to become open as the engaging portion 79a engages the disc 25.

Figure 9:
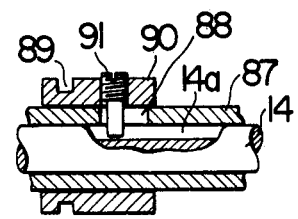
FIG. 9 is a fragmentary elevational section of a shutter support shaft which permits an adjustment of the shutter opening.

At its opposite ends, the shutter shaft 14 is rotatably mounted on the camera body, and a first sector-shaped shutter blade 85 is fixedly mounted thereon substantially at the middle position thereof. A second shutter blade 86 disposed in overlapping relationship with the first shutter blade 85 is fixedly mounted on the rear end of the sleeve 87 which loosely fits on the shutter shaft 14. The sleeve 87 is formed with a cam groove 88 which is in the form of part of a helix. A slidable sleeve 90 having a circumferential groove 89 loosely fits on the sleeve 87, and fixedly carries a radially extending pin 91, the inner end of which extends through the cam groove 88 in the sleeve 87 and engages an axially extending rectilinear groove 14a formed in the shutter shaft 14 (see FIG. 9). As a consequence, as the slidable sleeve 90 slides axially, the second shutter blade 86 can be rotated relative to the first shutter blade 85, thus changing the shutter opening. A shutter opening adjusting device of this type which permits an adjustment of the shutter opening by using a pair of shutter blades is well known in the art.

A fork 92 loosely engages the circumferential groove 89 in the slidable sleeve 90. The fork 92 is formed on a slide member 93 which is supported by the sideplate 52 so as to be slidable in the forward and rearward direction. The slide member 93 fixedly carries a pin 94, which loosely fits in an elongate slot 96 formed in the upper end of an arm 95, which is rockably mounted on a shaft 97 fixedly mounted on the sideplate 52, as shown in FIGS. 4 and 5. A follower member 98 and an operating member 99 for adjusting the shutter opening are also pivotally mounted on the shaft 97, and the follower member 98 is fixedly connected with the arm 95 by a headed set screw 101 which extends through a slot 100 in the arm 95. Thus unless the screw 101 is loosened, the follower member 98 and the arm 95 remain substantially integral with each other.

A pin 102 is fixedly mounted on the follower member 98 and bears against the peripheral surface of the eccentric cam 45. The follower member 98, being integral with the arm 95, is biased to rock about the shaft 97 by a spring 103 which pulls the slide member 93 in the forward direction, thus maintaining the engagement between the pin 102 and the eccentric cam 45.

The operating member 99 is formed with a folded piece 99a, which bears against an edge 98a of the follower member 98. One end of a leaf spring 104 is rivetted at 105 to the lower end of the operating member 99, and the lower end of the leaf spring 104 is provided with a knob 106. A movable contact 108 is fixed to the leaf spring 104 with an electrically insulating element 107 interposed therebetween, and has its free end 108a disposed for selective engagement with one of a pair of stationary contacts 109, 110 which are disposed on the camera body. Resistors R1, R2 having different resistances are connected with the stationary contacts 109, 110 in order to change the aperture of a lens stop which is contained in an automatic exposure control device, depending on which of the stationary contacts 109, 110 the movable contact 108 engages. Since an automatic exposure control device which automatically controls the aperture of a lens stop in accordance with the brightness of an object being photographed is well known in the art of cine cameras, it will not be described in detail.

The leaf spring 104 is formed with an opening 111, which can be selectively engaged by projections 112a, 112b, 112c or 112d formed on a member 112 that is fixedly mounted on the camera body.

Referring again to FIG. 1, the slide member 93 has a projection 93a on its upper edge, and a lever 114 which is pivotally mounted at 116 on the camera body has one end maintained in abutment against the projection 93a under the resilience of a spring 115, the lever carrying a pointer 113 on its other end. The pointer 113 cooperates with a scale, represented in FIG. 1 by numerals 0, 50, 100 and 170, which represent the shutter opening formed by the first and the second shutter blade. These numerals indicating the shutter opening are also marked on the member 112 shown in FIG. 5, and a selected one of them may be chosen by operation of the knob 106 so that the selected numeral can be viewed from the eyepiece through a viewfinder, for example.

USUAL PHOTOGRAPHING

In usual operation, photographing takes place by directing the cine camera toward an object to be photographed, and depressing one end of 19F of the shutter button 19 (see FIG. 2) in the direction of arrow F to rotate the motor M in its forward direction. At this time, the clutch 32 is retracted and disengaged from the worm 28, and hence the rotation of the film drive shaft 16 is not transmitted to the worm 28. The gear 31 remains at rest in the position shown in FIG. 6A while the two arm member 60 assumes its left-hand position shown in FIG. 6A. As a result, the fade out/fade in photographing controlling apparatus is inoperative.

Under this condition, the rotation of the output shaft 10 of the motor M is transmitted to the shutter shaft 14 through the gears 12, 13 and 15, and is also transmitted to the film winding shaft 23 through the gears 12 and 17, shaft 16, worm 20, worm wheel 21, intermediate gears if necessary (not shown), gear 22 and frictional coupling leaf spring 26. The film is advanced by a pawl of a known form which operates in response to the rotation of the shutter shaft 14. Since the usual photographing operation in accordance with the present invention is completely similar to a conventional one, it will not be described in detail.

FADE OUT PHOTOGRAPHING

Figure 6B:
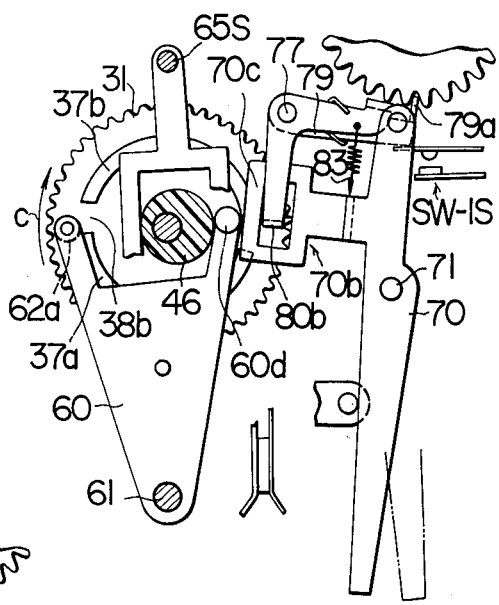
Figure 6C:
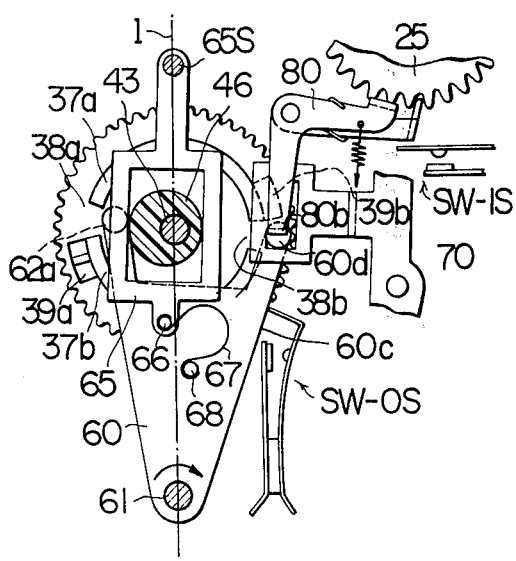

For fade out photographing, the end 70a of the operating member 70 is manually rotated forward against the spring 73, to the position shown in FIG. 6B, thereby causing the shifter 35 to move the clutch 32 forwardly into engagement with the worm 28. The position to which the operating member 70 has rotated is maintained by the detent member 76, as shown in FIG. 8. The fade out photographing operation is then performed in the course of usual photographing, namely, while the shutter button is held depressed.

As the operating member 70 is rocked, the side 70c of its rectangular frame 70b moves the engaging and disengaging portion 80b of the release member 80 to the right, rotating it against the resilience of the spring 83 to cause the engaging portion 79a of the detent arm 79 to engage the peripheral teeth in the disc 25 so as to stop the rotation of the film winding shaft 23 and thus the rotation of disc 24 and pin 27. As a consequence, the gear 22 driven by the film drive shaft 16 undergoes an idling rotation with respect to the shaft 23, overcoming the frictional force applied by the leaf spring 26. However, the film itself continues to be fed by the film feeding pawl, and is forced into a space within the film cassette without being received by a take-up reel in the film cassette which has stopped with its driving pin 27. The length of the film portion which is thus fed into this space corresponds to about 90 frames, and takes about 5 seconds for its feeding. It will be appreciated that film cassettes include a space which accommodates such length of film. As the detent arm 79 rocks to engage the disc 25, the switch SW-IS is opened or turned off, but switch SW-OS which is connected in parallel therewith remains closed or is turned on to permit the rotation of the motor M to be continued.

The coupling between the clutch 32 and the worm 28 causes the film drive shaft 16 to drive the gear 31 in the clockwise direction or in the direction indicated by the arrow c, through worm 28, worm wheel 29 and gear assembly 30. The gear 31 is referred to hereinafter as a rotary member. The rotation of the rotary member 31 begins at a position shown in FIG. 6B where the pin 62a is in the proximity of the leaving passage 38b. As the rotary member 31 begins to rotate clockwise from the position shown in FIG. 6B, the step 41a in the cam sleeve 40 bears against the pin 48, thus rotating the stepped cam 44 in the same direction.

When the rotary member 31 has rotated through 180° from its starting position shown in FIG. 6B, the eccentric cam 46 which is referred to hereinafter as a first cam will assume a position shown in FIG. 6C in which the larger diameter portion thereof has caused the rocking member 65 to rock clockwise about the pivot 65S, thus displacing the pin 66 to the left-hand side of the line l. As the pin 66 traverses the line l, the pin 62a on the arm member 60 bears against the outer periphery of arcuate rib 37a before the rotary member 31 completes its rotation through 180° since the member 60 which is connected with the rocking member 65 through the spring 67 is then biased for clockwise rotation about its pivot 61. The arm member 60 momentarily rotates in the clockwise direction under the resilience of the spring 67 when the rotary member 31 has rotated through 180° to align the entering passage 38a with the pin 62a and to align the leaving passage 38b with the pin 62b. As the pin 62b moves out of the passage 38b, the pin 60d (see FIG. 1) which is located on the back side of the pin 62b is just aligned with the engaging and disengaging portion 80b of the release member 80.

When the rotary member 31 has rotated through 180° and the two arm member 60 rocks momentarily as mentioned above, the right-hand edge of the two arm member moves the movable contact of the switch SW-OS, thus opening the switch contacts. Since the switch SW-IS which is connected with the source B in parallel with the switch SW-OS is already turned off, the turning off of the switch SW-OS deenergizes the motor M, which therefore comes to a stop.

Figure 10A:
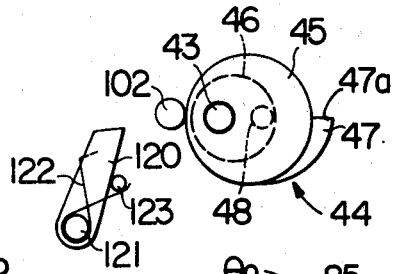
FIGS. 10A to 10C are schematic side elevations of a shutter opening controlling cam and shutter blades controlled thereby, illustrating the operational relationship therebetween.
Figure 10B:
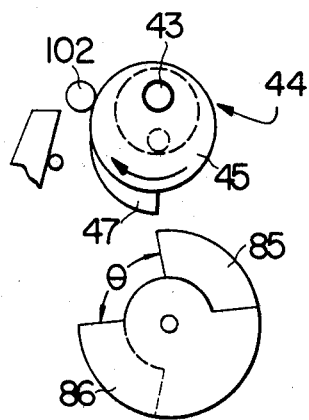
Figure 10C:
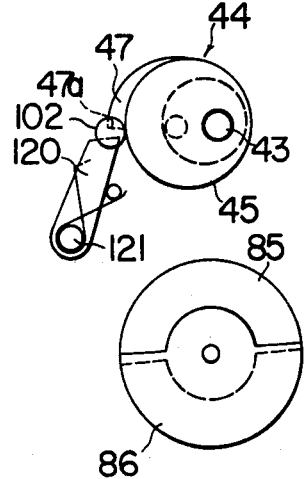

During the rotation of the rotary member 31 through 180°, a shutter closing operation which is unique to the fade out photographing proceeds. As shown in FIGS. 10A–C this shutter closing operation takes place by the action of the eccentric cam 45, which is referred to hereinafter as a second cam, to move the pin 102 outwardly.

FIG. 10A shows the condition immediately preceding a fade out operation. The pin 102 which bears against the second cam 45 assumes its closest position to the shaft 43.

FIG. 10B shows an intermediate condition which is nearly halfway along in the fade out photographing operation, and the pin 102 is further removed from the shaft 43 than in FIG. 10A. As the pin 102 is pushed outwardly by the second cam 45, the arm 95 integral with the follower member 98 on which the pin 102 is secured rotates in the direction of an arrow d about the shaft 97, as shown in FIG. 5, whereby the slide member 93 is moved rearwardly against the resilience of the spring 103, and the fork 92 of the slide member 93 moves the sliding sleeve 90 (see FIG. 1) rearwardly to restrict or reduce the shutter opening to a value $\theta$ which is nearly 90°.

When the second cam 45 rotates through 180° together with the rotary member 31 as shown in FIG. 10C, the pin 102 assumes the furthest position from the shaft 43, resulting in a zero shutter opening. Thus, any rotation of the shutter blades cannot provide the usual exposure to the film.

When the rotary member 31 has rotated through 180°, the disc 53 (see FIGS. 7A–C) has also rotated through 180°. Referring to FIG. 7A, parts are shown in the positions which they assume immediately prior to the initiation of rotation of the disc 53. Shortly after the initiation of rotation of the disc in the clockwise direction, tab 55a on the switch operating lever 55 enters the opening 54b, thereby opening the switch SW-RS which has been held in its closed condition (FIG. 7C). As the disc 53 further rotates, the edge 54c of the opening 54b acts to depress the tapered surface 55c (see FIG. 11) of the tab 55a, thereby turning the switch SW-RS on again. However, the cycling of the switch SW-RS through on-off-on positions has no influence upon the motor M during the fade out photographing operation, as will be noted from FIG. 2.

Figure 7B:
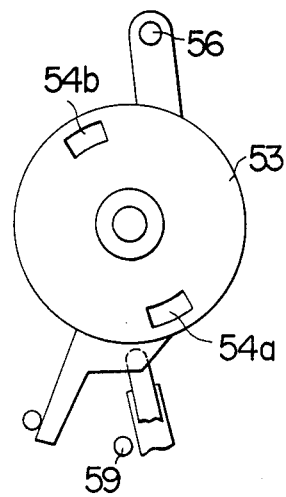
FIGS. 7A to 7C are side elevations of a control mechanism associated with a reverse feed stop switch for the shutter and film drive motor.
Figure 7A:
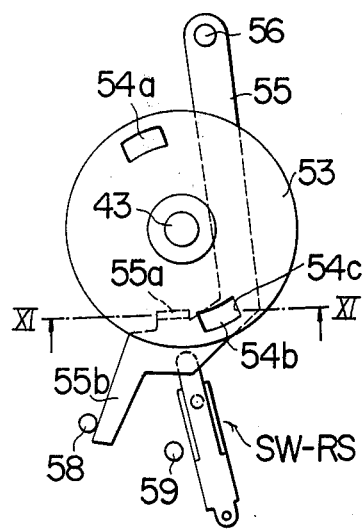
Figure 7C:
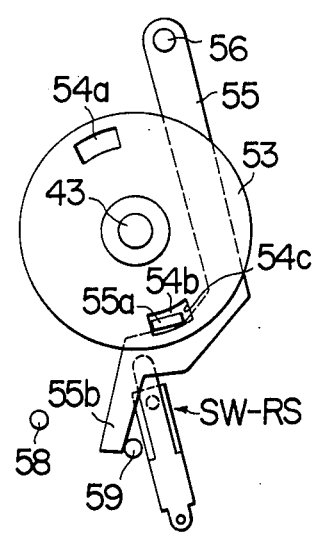

FIG. 7B shows the position of various parts at the termination of rotation of the disc 53 through 180°. Obviously, the switch SW-RS remains on.

From the foregoing description, it will be understood that the fade out photographing operation is initiated by operating the operating member 70 in the course of a normal photographing operation, and proceeds during the rotation of the rotary member 31 through 180° in one direction or in a first direction, and is completed at the end of 180° rotation of the rotary member 31 when the switch SW-OS is turned off to deenergize the motor M.

REVERSE FILM FEEDING

To reverse feed the film the other end 19R of the shutter button 19 may be depressed in the direction of the arrow R subsequent to the completion of the fade out photographing operation, thereby closing the switch SW-R to complete a circuit including the switch SW-RS which energizes the motor M for rotation in the reverse direction. As the motor M rotates in the reverse direction, the shutter shaft 14 also rotates in the opposite direction, and the film feeding pawl which is operatively associated therewith begins to feed the film in the reverse direction. Since the shutter opening is completely closed, no exposure of the film occurs during the rotation of the motor in the reverse direction, and the disc 25 remains locked by the detent arm 79. Thus, the rotation of the film drive shaft 16 in the reverse direction does not provide any drive to the film winding shaft 23.

At the same time with the initiation of rotation of the motor M in the reverse direction, the rotary member 31 begins rotating in the reverse direction, that is, in a counterclockwise direction from the position shown in FIG. 6C. When the rotary member 31 rotates in this manner, the disc 53 begins rotating in the counterclockwise direction from the position shown in FIG. 7B. Thereupon, the tab 55a which bears against the disc 53 is frictionally moved or dragged to rock the switch operating lever 55 about the pivot 56 into abutment against the stop 59. As the disc 53 continues to rotate and has rotated through 180° exactly, the tab 55a enters the opening 54b, turning off the switch SW-RS which has been held closed by the lever 55. Thereupon, the circuit for energizing the motor M for rotation in the reverse direction is opened, thus allowing the motor rotation to be interrupted simultaneously with the turning off of the switch SW-RS.

During the time the rotary member 31 rotates through 180° in the opposite direction, the pin 48 which bears against the bevelled surface 42b of the cam sleeve 40 is only subjected to an axial thrust by this surface against the resilience of the spring 50 (see FIG. 3) but no substantial rotational force. Consequently, the rotation of the rotary member 31 in the opposite direction is not transmitted to the stepped cam 44, which is therefore left stationary during the rotation of the rotary member in the opposite direction. In order to ensure this, there is provided an anti-reverse locking member 120 which as shown in FIGS. 10 A–C, is pivotally mounted on a pin 121 secured to the sideplate 52 and which is biased for clockwise rotation about the pin 121 by a spring 122. The resulting rotation is limited by a stop 123. The free end of the locking member 120 is located on the path of rotation of the third cam 47 so that the step 47a in the third cam 47 bears against the free end of the locking member 120 upon completion of the fade out photographing operation. In this manner, a rotation of the stepped cam 44 in the reverse direction is prevented by the locking member 120 if any substantial rotative effort in the opposite direction is applied to the stepped cam 44 by the frictional engagement between the bevelled surface of the cam sleeve 40 and the pin 48.

Figure 6D:
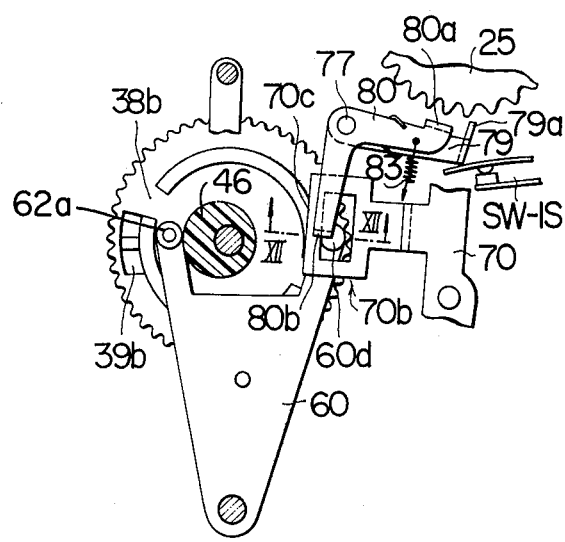

Shortly before the rotary member 31 stops after its rotation through 180° in the reverse direction, or shortly before the tab 55a on the lever 55 enters the opening 54b in the disc 53 to turn off the switch SW-RS, the chevron-shaped cam 39a on the rotary member 31 pushes up the pin 62b to cause the end face of the pin 60d to disengage the engaging and disengaging portion 80b out of the rectangular frame 70b, as illustrated in FIG. 12. As the portion 80b is disengaged from the side 70c, release member 80 rotates clockwise about the pin 77 under the resilience of the spring 83, as illustrated in FIG. 6D, with its folded piece 80a causing the detent arm 79 to rotate in the same direction to disengage the portion 79a thereof from the disc 25, thereby releasing constraint on the film winding shaft 23 and simultaneously turning the switch SW-IS on with the detent arm 79. When the rotary member 31 continues its rotation through an additional slight amount to terminate the 180° rotation in the reverse direction, the chevron-shaped cam 39a is disengaged from the pin 62b, whereby the pin 60d which has been holding the engaging and disengaging portion 80b outwardly moves out of the rectangular frame 70b. However, since the portion 80b bears against the side 70c, it cannot enter the rectangular frame 70b again.

As discussed above, during a reverse film feeding which follows the completion of a fade out photographing operation, the rotary member 31 rotates in the reverse direction while the stepped cam 44 remains stationary, and constraint on the film winding shaft 23 is released toward the end of the process. Upon completion of 180° rotation in the reverse direction, the switch SW-RS is turned off to deenergize the motor M. The length of film which is rewound during the 180° rotation of the rotary member 31 in the reverse direction corresponds to approximately 90 frames over which the fade out photographing operation took place.

FADE IN PHOTOGRAPHING

The above mentioned reverse film feeding operation has served to rewind the film to a position in which the initial frame thereof at which the fade out photographing operation commenced is aligned with a taking window (not shown). The end 19F of the shutter button 19 is now depressed again to cause the motor M to rotate in the forward direction, whereby the shutter begins rotation and the film begins to be fed. At the same time, the film winding shaft 23 rotates in a direction to take up the film, and the pin 27 acts to rotate the film take-up reel housed within the film cassette, thus winding the film.

At the same time with the initiation of rotation of the rotary member 31 in the forward direction, the step 41b in the cam sleeve 40 moves the pin 48 so as to rotate the stepped cam 44 in the forward direction. As the stepped cam 44 rotates, the pin 102 which has been moved outwardly by the second cam 45 now moves toward the shaft 43, as illustrated in FIG. 10C, so that the arm 95 rocks in the opposite direction from that indicated by an arrow d as viewed in FIG. 5, causing the slide member 93 to advance, thereby gradually increasing the shutter opening which until then has been held closed. When the rotary member 31 has rotated through 180°, the shutter opening resumes its maximum value of 170° which it initially exhibited.

Shortly before the termination of 180° rotation by the stepped cam 44 and the rotary member 31 in the forward direction, the third cam 47 moves the folded piece 76b of the detent member 76 outwardly, as illustrated in FIG. 13, whereby the detent member 76 rocks about the pivot 77 against the resilience of the spring 78. In this manner, the pin 75 is disengaged from the projection 76a thereon, releasing the constraint on the operating member 70. As a consequence, the operating member 70 returns to its initial position or the position shown in FIG. 6A, under the resilience of the spring 73. When the operating member 70 returns to its original position, the portion 80b of the release member 80 again enters the rectangular frame 70b. On the other hand, the shifter 35 retracts the clutch 32, decoupling it from the worm 28, whereby the transmission of rotation from the film drive shaft 16 to the rotary member 31 is interrupted, and the rotary member 31 ceases to rotate. The rotary member 31 ceases to rotate when it has just rotated through 180°, but before it ceases to rotate, the engaging and disengaging portion 76b which has been held outward by the third cam 47 (see FIG. 13) is disengaged therefrom during the remaining slight amount of rotation of the third cam 47.

Immediately before the portion 76b is disengaged from the third cam 47 or the rotary member 31 completes its rotation through 180° in the forward direction, the two arm member 60, which was biased for clockwise rotation before, but is then biased for counterclockwise rotation by the action of the rocking member 65 and the spring 67, rocks counterclockwise about the pin 61 to return to its original position when the passages 38b, 38a, on the rotary member 31 become aligned with the pins 62a, 62b, respectively. After the two arm member 60 has returned to its original position, the subsequent rotation of the rotary member 31 through a slight amount is effective to disengage the clutch 32 from the worm 28, whereby the rotary member 31 comes to a stop, terminating the fade in photographing operation. FIG. 7C shows the condition of disc 53 when the reverse film feeding is completed. At the same time with the commencement of the fade in photographing operation, the disc 53 begins to rotate clockwise from the position shown in FIG. 7C together with the rotary member 31, whereby the projection 55a, through its engagement with the opening 54b, causes the switch operating lever 55 to rotate clockwise about the pivot 56. After the lever 55 bears against the stop 58, the projection 55a is urged out of the opening 54b, allowing only the disc 53 to rotate.

If the end 19F of the shutter button 19 is held depressed after the rotary member 31 has come to a stop, the photographing operation continues in the normal manner. During such a continued normal photographing operation, another fade out cycle can be performed by operating the operating member 70 again.

MANUAL ADJUSTMENT OF THE SHUTTER OPENING

Referring to FIG. 5, the shutter opening can be reduced by flexing the leaf spring 104 in a direction to disengage the opening 111 from the projection 112d by pushing the knob 106 with the fingertips. Subsequently, the knob 106 is moved in a direction indicated by an arrow e to rock the operating member 99 about the shaft 97 so as to also rotate the follower member 98 about this shaft 97 with its folded piece 99a. Thus, the shutter opening can be freely adjusted by manually rocking the follower member 98 through member 99 instead of rocking the follower member 98 with the second cam 45.

CORRECTION OF LENS STOP OPENING OF AUTOMATIC EXPOSURE CONTROL

Where a high speed movement of an object being photographed is involved, the use of a large shutter opening will result in a blur as a result of the increased exposure to the film. Such inconvenience can be avoided by reducing the exposure period of the film through reducing the shutter opening. However, a reduction in the shutter opening may cause a corresponding underexposure. The problem of underexposure may be eliminated by choosing suitable values for the resistors R1, R2 which are contained in the automatic stop control circuit. The valves are chosen in a manner such that a stop opening in the lens, which exceeds an aperture normally obtained for a shutter opening corresponding to an angle of 100°, for example, may be obtained when the operating member 99 is set to assume a position which corresponds to a reduced shutter opening, for example, when the knob 106 is set to an angle of 50° for the shutter opening.

What is claimed is:

1. In a cine camera of the type having means for adjusting a shutter opening comprising:
    a pair of sector-shaped shutter blades disposed for rotation into overlapping relationship on an optical axis passing through said shutter opening;
    wherein the improvement comprises:
    means for fade photographing comprising:

an operating member for initiating a fade photographing operation and rockable between a first and a second position;
detent means for locking the operating member in the second position;
a rotary member capable of rotation in a first direction and in an opposite, second direction;
a motor means for operating in a forward and reverse direction;
energizing means for operating said motor means comprising a cut-off switch and a reverse rotation switch;
means connected to said motor means for driving one of said pair of shutter blades and for driving a film past said optical axis;
clutch means disposed between the motor means and the rotary member for transmitting a drive output from the motor means to the rotary member when the operating member is in its second position;
a cam member including first and second eccentric cam surfaces and disposed on the same shaft as the rotary member for integral rotation with the rotary member only when the rotary member rotates in the first direction;
fade out stop means operable in following relationship with the first eccentric cam surface when the rotary member rotates in the first direction for turning off said cut-off switch and deenergizing the motor means when the rotary member has rotated through 180°;
an operating button means capable of being operated externally of the camera for closing said reverse rotation switch for the motor means, to cause a rotation of the motor in the reverse direction for feeding the film in a reverse direction during the time the rotary member rotates through 180° in the second direction;
reverse film feed stop means for interrupting the rotation of the motor means when the rotary member has rotated through 180° in the second direction;
means for unlocking said operating means;
a third cam surface on the cam member for operating said unlocking means and releasing the operating member from the detent means when the rotary member has again rotated through 180° in the first direction, thereby interrupting the rotation of the rotary member;
shutter opening control means for operating the other of said pair of shutter blades; and
means connecting the second cam surface and the shutter opening control means for varying the shutter opening in a decreasing direction during the initial rotation of the rotary member through 180° in the first direction, and for varying the shutter opening in an increasing direction during the final rotation of the rotary member through 180° in the first direction.

2. A cine camera comprising:
means for directing light to be photographed along an optical axis into said camera;
means for feeding film past said optical axis for photographing said light including an electric motor; and
shutter means disposed in front of said film for controlling the passage of said light thereto;
wherein the improvement comprises:
an operating means for initiating fade photography including a manually pivotable lever;
control means responsive to said operating means for controlling said shutter means and said film feeding means during said fade photography, said control means comprising:
means for stopping said film feeding means after the initial advance of a given portion of film past said optical axis;
means for stopping said reversing means when said given film portion has passed said optical axis in reverse;
means for readvancing said film feed means after the stopping of said reversing means; and
means for driving said shutter means between a light passing position and a light blocking position during said initial advance of said film portion to produce fade out photography, said driving means maintaining said shutter means in said light blocking position during said reverse feeding of said film portion and driving it between said light blocking position and said light passing position during the readvancing of said film portion past said optical axis to produce fade in photography;
and wherein:
said operating means further comprises clutch means for connecting said control means to said film feeding means in response to the pivoting of said lever to a fade photography initiating position;
said means for driving said shutter means comprises gear means connected to said film feeding means by said clutch means for rotating in a first direction and in an opposite second direction, each through 180°; and
said means for stopping said film feeding means comprises:
switch means for deenergizing said electric motor;
frame means having an opening therein for pivoting between a first and a second position;
cam means disposed within said opening in said frame means and rotatable with said gear means when it is rotated in the first direction for pivoting said frame means between said first and said second position;
sector means pivotable at one end and having a pair of arms extending from its other end; and
spring means connected between said frame means and said sector means for pivoting said sector means between a third and a fourth position in response to the pivoting of said frame means between said first and said second positions, said sector means energizing and deenergizing said switch means when respectively in said third and fourth positions 3. A camera as in claim 2 wherein said means for stopping said reversing means comprises:
disc means for rotating with said gear means;
switch means for deenergizing said film feeding means; and
means cooperating with said rotating disc means for opening and closing said switch means.

4. A camera as in claim 2 wherein said shutter means comprises a pair of sector-shaped shutter blades rotatable into overlapping relationship on said optical axis, one of said blades being driven in cooperation with said film feeding means; and said driving means further comprises means for driving the other of said pair of shutter blades.

5. A camera as in claim 2 further comprising means for taking up the film being fed by said film feeding means; and means for stopping said film taking up means during said fade out photography and the reverse feeding of said film portion.

6. A camera as in claim 2 further comprising means for ending the fade photography comprising:
means for pivoting said lever away from said fade photography initiating position; and
second cam means rotatable with said follower means for actuating said pivoting means.

7. A cine camera comprising:
means for directing light to be photographed along an optical axis into said camera;
means for feeding film past said optical axis for photographing said light; and
shutter means disposed in front of said film for controlling the passage of said light thereto;
wherein the improvement comprises:
an operating means for initiating fade photography including a manually pivotable lever;
control means responsive to said operating means for controlling said shutter means and said film feeding means during said fade photography, said control means comprising:
means for stopping said film feeding means after the initial advance of a given portion of film past said optical axis;
means for reversing said film feeding means to feed said given film portion in reverse past said optical axis;
means for stopping said reversing means when said given film portion has passed said optical axis in reverse;
means for readvancing said film feed means after the stopping of said reversing means; and
means for driving said shutter means between a light passing position and a light blocking position during said initial advance of said film portion to produce fade out photography, said driving means maintaining said shutter means in said light blocking position during said reverse feeding of said film portion and driving it between said light blocking position and said light passing position during the readvancing of said film portion past said optical axis to produce fade in photography;
and wherein:
said operating means further comprises clutch means for connecting said control means to said film feeding means in response to the pivoting of said lever to said photography initiating position; and
said means for driving said shutter means comprises:
gear means connected to said film feeding means by said clutch means for rotating in a first direction and in an opposite second direction, each through 180°;
cam means on said gear means for rotating therewith;
follower means cooperating with said cam means for rotating with said gear means when it rotates in the first direction and for idling when said gear means rotates in the second direction; and
means connected to said follower means for rotation therewith and for operating said shutter driving means when rotating.

8. A camera as in claim 7 wherein said means for stopping said reversing means comprises:
disc means for rotating with said gear means;
switch means for deenergizing said film feeding means; and
means cooperating with said rotating disc means for opening and closing said switch means.

9. A camera as in claim 7 wherein said shutter means comprises a pair of sector-shaped shutter blades rotatable into overlapping relationship on said optical axis, one of said blades being driven in cooperation with said film feeding means; and said driving means further comprises means for driving the other of said pair of shutter blades.

10. A camera as in claim 7 further comprising means for taking up the film being fed by said film feeding means; and means for stopping said film taking up means during said fade out photography and the reverse feeding of said film portion.

11. A camera as in claim 7 further comprising means for ending the fade photography comprising:
means for pivoting said lever away from said fade photography initiating position; and
second cam means rotatable with said follower means for actuating said pivoting means.

* * * * *